Oct. 18, 1938.  B. S. PENLEY  2,133,473
APPARATUS FOR SURFACING ROOFING
Filed Dec. 12, 1934
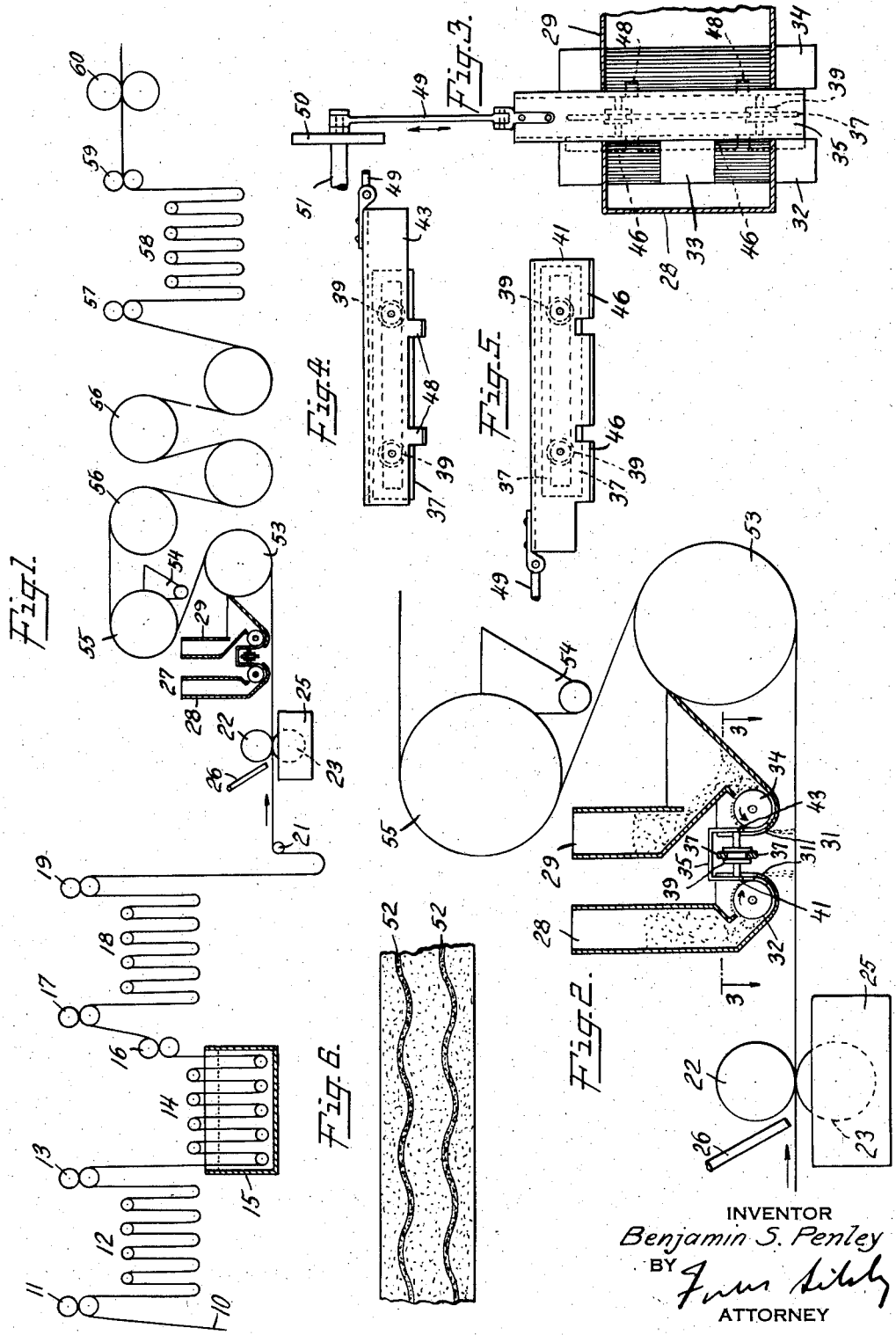
INVENTOR
Benjamin S. Penley
BY
ATTORNEY Patented Oct. 18, 1938

2,133,473

UNITED STATES PATENT OFFICE 2,133,473

APPARATUS FOR SURFACING ROOFING

Benjamin S. Penley, Yeadon, Pa., assignor to The Barrett Company, New York, N. Y., a corporation of New Jersey Application December 12, 1934, Serial No. 757,121

9 Claims. (Cl. 91—43)

This invention relates to roofing, and more particularly, to the surfacing of roofing with differently colored granular material to produce roofing presenting a variegated appearance. The term "roofing" is used herein in a broad sense and is intended to include not only the usual felt base composition roofing, whether employed for covering roofs, walls, or other surfaces, but also other covering material, such as that made from a mastic or adhesive composition and adapted to be surfaced with granular material.

It has been proposed to surface roofing by applying contiguous longitudinal parallel stripes or bands of differently colored granular material to a roofing sheet. To create wavy stripes on the roofing sheet, the hopper from which the granular material was fed onto the sheet was reciprocated transversely of the direction of movement of the sheet. To get away from the monotonous regularity of such striped sheets, it has been suggested that granular material be applied in two steps, the granular material applied during the first step covering selected areas and granules of a contrasting color applied during the second step covering the entire sheet including the portions of the sheet covered in the first step. Such procedure, it will be appreciated, involves the excessive handling and waste of granular material. Furthermore, a considerable excess of granular material of different colors is applied. This must be removed from the sheet and recovered. It is difficult and requires a complicated mechanical layout to recover such excess granules without mixing the colors and the resultant irregular blend is of diminished value for surfacing.

It has also been proposed to simultaneously apply to a roofing sheet two streams of granular material, each stream of a width sufficient to completely cover the sheet. One stream was fed from a hopper having partitions dividing it into compartments containing differently colored granular material so that a striped effect was produced. The other stream was fed from a hopper containing a solid color of granular material which blended with and masked to some extent the color of the stripes produced by the granular material fed from the first-mentioned hopper. Such procedure also involves excessive handling and waste of granular material.

It is an object of this invention to provide an apparatus for simultaneously feeding a plurality of sets of spaced wavy streams of granular surfacing material onto a continuously moving, coated roofing web without feeding the material through openings or orifices which are likely to become clogged. The sets of streams are applied in different planes spaced longitudinally of the sheet, with the individual streams of one set staggered widthwise of the sheet with respect to those of the other set. The apparatus is so constructed that the aggregate width of the streams is such as to at least completely cover the entire width of the roofing sheet.

Another object of this invention is to provide a hopper having a novel distributor roll for causing discharge of granular material from certain portions only of the hopper.

A further object of this invention is to provide apparatus comparatively simple in design and efficient in operation which will reduce the handling of the granular material as compared with heretofore existing apparatus.

Other objects and advantages of this invention will appear from the following detailed description taken in connection with the accompanying drawing, in which Fig. 1 is a side elevation, somewhat diagrammatic in character, showing equipment embodying my invention for making composition roofing;

Fig. 2 is a vertical section, partly in elevation through surfacing apparatus embodying this invention;

Fig. 3 is a horizontal section, partly in elevation taken in a plane passing through line 3—3 of Fig. 2, parts of the hoppers being omitted;

Fig. 4 is a view in elevation of one side of the shield controlling discharge of granular material from the hoppers;

Fig. 5 is a view in elevation of the other side of the shield; and

Fig. 6 is a fragmentary plan view of roofing surfaced in accordance with this invention.

Referring to the drawing, with particular reference to Fig. 1, a sheet of fibrous material 10, which may be and preferably is the usual roofing felt made of rag fiber, paper stock or other fibrous material, with or without suitable fillers, as well known in the roofing art, is fed by feed rolls 11 from the usual paper making machine or felt roll into a looping device 12. From this looping device, rolls 13 feed the sheet into any suitable type of saturating apparatus indicated generally by the reference numeral 14. Saturating tank 15 may contain suitable cementitious waterproofing composition, such as asphalt or other bituminous material, utilized for the impregnation and saturation of roofing felts.

Feed rolls 16 and 17 feed the saturated sheet to a second looping device 18. The passage of the saturated fibrous sheet or base through the looping device 18 gives the saturant an opportunity to impregnate the base thoroughly and to dry. Feed rolls 19 feed the saturated sheet from the looping device 18 to the coating apparatus involving a pair of coating rolls 22, 23. Feed rolls 19 are preferably driven at a slightly greater peripheral speed than the coating rolls 22, 23, slack accumulating between the feed rolls and the guide roll 21 over which the sheet passes before passing over the coating roll 23. Coating roll 23 is rotatably mounted in a tank 25 which may contain bituminous material, such as asphalt or other cementitious waterproofing substance suitable for coating roofing felt. Bituminous material, such as asphalt, may be applied to the top of the sheet by means of a pipe 26 having a spout of a width approximately equal to that of the sheet. As the sheet passes between the coating rolls 22, 23, the underside is completely coated by roll 23. The coating material delivered by pipe 26 is spread uniformly over the top side of the sheet by the coating roll 22, excess coating material passing over the edges of the sheet and draining into the tank.

Immediately after leaving the coating roll 23 and while the coating material is still hot, soft and tacky, the coated sheet passes under the surfacing apparatus indicated generally by the reference numeral 27. In the embodiment of the invention shown in Fig. 2, the surfacing apparatus comprises two hoppers 28, 29 spaced apart longitudinally of the direction of movement of the roofing sheet and each extending crosswise the full width of the sheet. While the hoppers are shown in Fig. 2 as spaced apart, it might be desired to construct them as one hopper divided into two compartments by a partition.

Rotatably mounted in the bottoms of the hoppers 28, 29 and adjacent the discharge outlets thereof are fluted distributor rolls 32, 34. It will be seen from an inspection of Fig. 3 that distributor roll 32 is fluted throughout portions of its length, the fluted portions being separated by a smooth surfaced, unfluted portion 33. Upon rotation of the roll, the fluted portions pick up and agitate the granules disposed thereabove and function to produce a continuous stream of granules. The smooth surfaced portion of the roll slides under the granules thereon and hence does not cause the discharge of granules from the hopper. The rolls 32, 34 may be driven from any suitable source of power not shown. Preferably, however, the rolls are geared to the drive for the rolls or drums 55 or 56 which pull the sheet through the apparatus so that the speed of rotation of rolls 32, 34 and consequently the velocity of the granular surfacing material discharged from the hoppers is proportional to the sheet speed. By gearing the drive for the grit distributing rolls to the drive for feeding the sheet through the apparatus, the distributing rolls are driven only when the sheet is moved through the apparatus.

As shown in Figs. 2, 3, 4 and 5, a shield 35 having a shape in cross-section corresponding generally to that of an inverted U, is supported for transverse sliding movement between a pair of parallel guides 37, 37 which may be stationarily supported from any fixed part of the machine or from the floor. A plurality of rollers 39 provided with flanges and cylindrical portions are rotatably mounted between the sides 41 and 43 of shield 35. The cylindrical portions of the rollers 39 extend between the guides 37, 37 and the flanges thereof project along the sides of the guides. The rollers cooperate with the guides to prevent vertical or horizontal movement of the shield in the direction of travel of roofing sheet 10, while permitting horizontal movement of the shield in a direction transversely of the sheet.

The side 41 of the shield 35 is formed with projections 46 and the side 43 is provided with projecting members 48. The projecting members 46, 48 extend thru the outlet openings 31 of hoppers 28, 29 and between the walls of the hoppers and the distributor rolls 32, 34. It will be noted that the projections 46, 48 are curved to correspond to the contour of the distributor rolls and hopper walls. This provides a snug fit and avoids jamming of the granular material between the moving parts. The shield 35 controls the distribution of surfacing material upon the roofing sheet, the projections 46, 48 preventing flow of granules through the portion of the discharge outlets 31 of the hopper obstructed thereby. The granular material escapes in streams thru the portions of the discharge outlets not closed by the projections. The open portions of side 41 may be substantially complemental to those of the side 43. However, it is preferred that the open portions in one side shall slightly overlap those of the other to insure that no unsurfaced portions will appear on the roofing sheet.

The shield 35 may be reciprocated transversely to the direction of movement of the sheet, as for example by a link 49 having one end secured to the shield and having the other end pivoted to a disc or crank 50 keyed to shaft 51 which is arranged to be rotated from any suitable source of power. As is apparent, rotation of shaft 51 and crank 50 causes simultaneous reciprocation of the link 49 and the shield 35.

In operation grit, such as crushed slate, rock, or other mineral granules of different colors, coarseness or other characteristics are supplied to the hoppers 28, 29. The fluted portions of distributor roll 32 are sufficient in extent and so positioned that they continually discharge granular material thru the portions of the discharge outlet of hopper 28 not covered by projections 46 during the reciprocation of shield 35. Rotation of distributor roll 34 also showers granular material thru the portions of the discharge outlet of hopper 29 not covered by the projections 48. The shield 35 presents advantages over known valve members having orifices for the discharge of granular material therethrough for the reason that the open portions of the shield will not become clogged or stopped as will the orifices of the valve members heretofore employed. Two sets of spaced streams of granular material of like wavy contour are formed, the wavy contour of the streams being due to the reciprocation of the shield, as hereinabove described, which preferably occurs continuously during the operation of the surfacing apparatus. Streams of one set travel in a substantially vertical plane from the hopper 28 onto the coated sheet 10 while the streams of the other set travel in a second substantially parallel vertical plane from the hopper 29 onto the sheet. The individual streams flowing through the open portions of the side 41 of the shield, it will be noted, are staggered with respect to the streams flowing through the open portions of the side 43, and the aggregate width of all the streams is at least equal to, and preferably somewhat greater than the width of the roofing sheet onto which the streams flow. As the shield is reciprocated both sets of streams are moved horizontally within their planes of flow onto the roofing sheet. Thus, as the coated sheet passes beneath the surfacing apparatus, wavy bands 52 are formed, the color thereof contrasting in color with that of the remaining portion of the sheet.

After being surfaced, as hereinabove described, the surfaced sheet passes about reversing roll 53, which functions to partially embed the mineral granules in the plastic coating. Any excess granules fall from the surfaced sheet into the hopper 29. If it is desired to apply a solid color of granules to the sheet from hopper 29 and not a blend of granules, a separate hopper may be provided above hopper 29 for receiving the excess granules falling off from the surfaced sheet.

In the continued passage of the surfaced sheet, it travels next under a hopper 54. Powdered talc, mica, or other anti-stick composition capable of rendering the back of the sheet non-cementitious is disposed in hopper 54 and is discharged therefrom onto the coating on the back of the sheet in the form of a talc surfacing layer covering substantially the entire width of the sheet. The talc covered sheet then passes over reversing roll 55 which partially embeds the talc in the sealback coating and imparts a smooth surface to the back of the sheet. Excess talc falls from the sheet as it passes from reversing roll 55 to the first of a series of calender rolls each identified by the reference character 56. From the calender rolls, the sheet may be fed by feed rolls 57 through looping device 58 where the coated and surfaced product is given an opportunity to cool. Feed rolls 59 may feed the surfaced sheet into a winding machine where it may be wound into rolls which are shipped or used as the desired roll roofing product, or these feed rolls may feed the surfaced sheet into cutting cylinders 60 for cutting the sheet into individual or strip shingles.

By "granular material" as used in the specification and claims is meant solid comminuted material whether of mineral or other origin which is capable of being used for surfacing roofing.

Since certain changes in construction of the above apparatus may be made without departing from the scope of this invention, it is intended that all matter contained in the above description or shown in the accompanying drawing shall be interpreted as illustrative and not in a limiting sense.

I claim:

1. Surfacing apparatus comprising in combination, a plurality of hoppers containing granular material, each of said hoppers being provided with discharge outlets, a rotary distributor roll located within each of said hoppers for effecting discharge of granular material through said outlets, and means for controlling the discharge of granular material from each of said hoppers, said means comprising a member having projections extending from the side edges thereof into the discharge outlets, the projections preventing discharge of the granular material from those portions of the discharge outlets into which they extend.

2. Surfacing apparatus comprising in combination, a plurality of hoppers containing granular material, each of said hoppers being provided with discharge outlets, a rotary distributor roll located within each of said hoppers for effecting discharge of granular material through said outlets, means for controlling the discharge of granular material from each of said hoppers, said means comprising a member having projections extending from the side edges thereof into the discharge outlets, the free ends of said projections being located within said hoppers, the projections preventing discharge of the granular material from those portions of the discharge outlets into which they extend and means for reciprocating said member.

3. Surfacing apparatus comprising in combination, a plurality of hoppers containing granular material, each of said hoppers being provided with a discharge outlet and a rotatable distributor roll adjacent said outlet, a member for controlling the discharge of granular material from each of said hoppers, said member having projections extending from the body thereof into the discharge outlets to prevent the discharge of granular material through portions of the outlets and to allow discharge of the granular material in streams through the portions of the outlets falling between said projections, said projections being staggered so that the streams discharged from one hopper are staggered with respect to those discharged from another hopper.

4. Surfacing apparatus comprising, a hopper containing granular material and provided with a discharge outlet, a distributor roll mounted within said hopper adjacent said discharge outlet for effecting discharge of granular material therethrough, means for controlling the discharge of the material from said hopper comprising a member having a body portion, projections extending from the body portion into said hopper and along a wall thereof and closing portions of said discharge outlet to prevent the discharge of the granular material through said portions, said means permitting the discharge of the granular material between said projections.

5. Surfacing apparatus comprising in combination a plurality of hoppers containing granular material, each of said hoppers being provided with a discharge outlet and a rotatable distributor roll adjacent said outlet, the distributor roll of at least one of said hoppers having portions of its cylindrical surface fluted and unfluted respectively, a member for controlling the discharge of granular material from each of said hoppers, said member having projections extending from the body thereof into the discharge outlets to prevent the discharge of granular material through portions of the outlets and to allow discharge of granular material in streams through the portions of the outlets falling between said projections, said projections being staggered so that the streams discharged from one hopper are staggered with respect to those discharged from another hopper, said distributor roll having fluted and unfluted portions positioned with respect to the discharge outlet with which it is associated so that the fluted portions discharge granular material through the portions of the outlet falling between said projections.

6. Surfacing apparatus comprising in combination, two hoppers for containing granular surfacing material, said hoppers including discharge outlets, a member for controlling the flow of material from said hoppers, said member having the general cross-sectional shape of an inverted U and having staggered projections on the sides thereof, said projections extending into said hopper discharge outlets.

7. Surfacing apparatus comprising in combination, a hopper for containing granular material, said hopper being provided with a discharge outlet, a distributor roll in said hopper adjacent said discharge outlet and adapted to feed the granular material therethrough, a shield for controlling the discharge of material from said hopper, said shield having a portion extending through said discharge outlet and into the space between the distributor roll and the hopper wall, said portion being curved to present a contour corresponding substantially to the contour of said distributor roll.

8. Surfacing apparatus comprising two hoppers having discharge outlets, a shield having a portion extending into the discharge outlet of one of said hoppers and another portion extending into the outlet of the other hopper, rollers rotatably mounted on said shield, stationary guide means cooperating to prevent vertical movement and horizontal movement in one direction of said shield and to permit horizontal movement of said shield in another direction, and means for reciprocating said shield.

9. A shield for controlling the discharge of material from hoppers comprising a U-shaped member having staggered projections on the sides thereof and means for supporting said member journalled on the sides thereof.

BENJAMIN S. PENLEY.